United States Patent [19]

Agerskans et al.

[11] 4,087,691
[45] May 2, 1978

[54] REFERENCE RADIATION SOURCE IN A DEVICE FOR MEASURING THE RADIATION FROM AN OBJECT

[75] Inventors: Jens Karl-Olof Agerskans, Akersberga; Andras Agoston, Taby, both of Sweden

[73] Assignee: AGA Aktiebolag, Lidingo, Sweden

[21] Appl. No.: 815,839

[22] Filed: Jul. 5, 1977

Related U.S. Application Data

[63] Continuation of Ser. No. 673,803, Apr. 5, 1976, abandoned.

[30] Foreign Application Priority Data

Apr. 9, 1975 Sweden ................................ 7504051

[51] Int. Cl.² .............................................. G01J 1/00
[52] U.S. Cl. .................................... 250/347; 250/334; 250/338
[58] Field of Search ......................................... 250/347

[56] References Cited

U.S. PATENT DOCUMENTS

| | | | |
|---|---|---|---|
| 3,612,879 | 10/1971 | Ohman | 250/347 |
| 3,617,106 | 11/1971 | Bjork | 250/236 |
| 3,631,248 | 12/1971 | Johnson | 350/7 |

*Primary Examiner*—Harold A. Dixon
*Attorney, Agent, or Firm*—Lerner, David, Littenberg & Samuel

[57] ABSTRACT

A device for measuring the radiation from an object by means of an optical system. The optical system comprises scanning devices for horizontal and vertical scanning with refracting rotating prisms. At least one radiation reference source is arranged in the optical system along the path of radiation from the scanned object so that the radiation source can be scanned by the rotating prisms at intervals which are not coincident with the interval when the object is scanned.

6 Claims, 18 Drawing Figures

REFERENCE RADIATION SOURCE IN A DEVICE FOR MEASURING THE RADIATION FROM AN OBJECT

This is a continuation of application Ser. No. 673,803, filed Apr. 5, 1976, now abandoned.

BACKGROUND OF THE INVENTION

The present invention relates to a device for measuring the radiation from an object by means of an optical system, said system comprising scanning means for scanning the image space with at least one refracting rotating prism.

Such scanning devices are known. For example, U.S. Pat. No. 3,253,498 describes a scanning device with a rotating prism, which prism scans in one dimension, the patent further stating that scanning in another dimension can be accomplished by means of a tilting mirror.

U.S. Pat. No. 3,617,106 describes a device which comprises two prisms, having their axes orthogonal to each other, said prisms, when rotating, scan an object in two dimensions.

As a rule, the detector in such a system may view a reference radiation source at periodic intervals in time. Such a reference radiation source may then be arranged in such a way that a so-called chopper part of the time reflects said reference radiation source towards the detector. The chopper is further adjusted so as to let radiation from the scanned object pass therethrough another part of the time. When using a detector with a stabilized temperature, the detector may serve as a reference radiation source by being reflected in the chopper and thus being reprojected on itself, all of which is described in U.S. Pat. No. 3,392,282.

SUMMARY OF THE INVENTION

Such a chopper is not necessary in the device according to the present invention and this eliminates the mechanical movement demanded when a chopper is used.

In the present invention, a reference radiation source is placed as near as possible to the scanned object and close to the detector. However, provision must be made to prevent stray radiation from the system being added to the reference radiation source. This is accomplished by having the detector operate under different conditions during object scanning and reference scanning. Thus, a reference radiation source, according to the present invention, may preferably be placed forward in the system without being affected by stray radiation when the reference radiation source is scanned.

Although this invention will be described with respect to its preferred embodiments, it should be understood that many variations and modifications will be obvious to those skilled in the art, and it is preferred, therefore, that the scope of the invention be limited, not by the specific disclosure herein but only by the appended claims.

DETAILED DESCRIPTION OF THE DRAWINGS

The device according to the present invention will be described by means of the attached drawings, in which FIG. 1 schematically shows an infrared scanning system having a reference radiation source according to the teachings of the present invention;

FIG. 2 shows a detail of such a system in which

FIG. 3 shows a detail of another embodiment similar to FIG. 2, wherein

Figure 1:
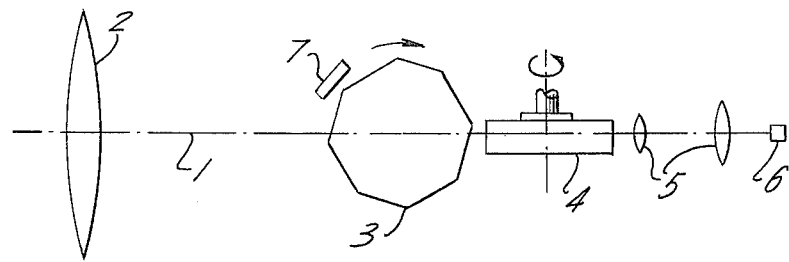

FIG. 1 shows schematically an infrared scanning system, in which the optical axis 1 falls through the center of a lens 2, schematically shown. The device is further provided with two scanning prisms 3 and 4; prism 3 being the vertical scanning prism and prism 4 being the horizontal scanning prism. The horizontal scanning prism of such a device rotates approximately 100 times faster than the vertical scanning device.

A lens system 5 is arranged between the scanning prisms and an infrared detector 6, which may consist of one or more elements. The detector 6 is further connected with electric circuits (not shown) for processing of the signal (see FIG. 6).

A reference radiation source, whose function and position will be described in the below figures is designated 7.

The radiation from the object to be scanned passes through the lens 2 and towards the scanning prisms 3 and 4 and by their rotation a scanning will take place in two dimensions. The detector transforms the radiation into an electric signal, said signal after treatment developing a thermogram on a display unit in a well-known manner.

In order to obtain an adequate processing of the signal from the detector, the radiation from a reference radiation source must hit the detector periodically. As described in the introductory part of the specification, it is known to use a chopper for this purpose. By placing a reference radiation source as shown in the figure, the chopper itself and its mechanical movement may be eliminated.

It is further preferably to place the reference radiation source as near as possible to the scanned object, i.e., as far to the left in the system shown in FIG. 1 as possible. A chopper serving as a reference radiation source or a reflecting device for such a source has in practice been clumsy to use or adjust in an infrared system if it is placed in the vicinity of the lens. In order to make the chopper as small as possible, it has been placed close to the detector. However, this causes certain disadvantages with respect to radiation. The most important disadvantage is that stray radiation from the system is not added to the radiation from the reference radiation source (chopper), arranged far back in the system.

The detector means, therefore, operates under different conditions during object scanning and reference scanning. A reference radiation source according to the present invention is placed far forward in the system and the stray radiation can then be controlled to a greater extent during those periods when the reference radiation source is scanned.

FIGS. 2a-2e show a four facet scanning prism.

In this embodiment the object and the lens are situated to the right of the figure and radiation 8 from the object, incident on the prism 9, is refracted depending on the position of the prism. In this way a scanning of an image plane will take place by means of the rotating prism 9. Said prism 9 rotates around the axis 11 and a detector placed at 12 will thereby scan line 10 in such a way that a parallel displacement of the ray bundle 8 occurs.

It has been mentioned that the detector is placed at 12 but it is, of course, possible that this point is only an image of the detector and thus further optical means, for instance another rotating prism, is placed between prism 9 and the detector, as described in U.S. Pat. No. 3,617,106.

The circumscribed circle of prism 9 is designated 15 and point 12 is situated on said circle 15.

Two reference radiation sources 13 and 14 are situated on each side of the optical axis of the system, comprising the prism. The reference radiation sources 13 and 14 are situated directly outside the circumscribed circle 15. FIGS. 2a-2e show how the ray path will move at different positions on the rotating prism in order to scan the two reference radiation sources and the object.

The prism 9 of FIG. 2 is supposed to rotate in a counterclockwise direction. In FIG. 2a the detector views a central part of the object while in FIG. 2b the upper part of the object image is viewed by the detector. In FIG. 2c the prism has rotated so much that radiation from the object will not reach the detector but instead the detector will view the reference radiation source 13. When the corner temporarily closest to point 12 passes said point, the detector will suddenly instead view the reference radiation source 14, and so on.

Figure 2A:
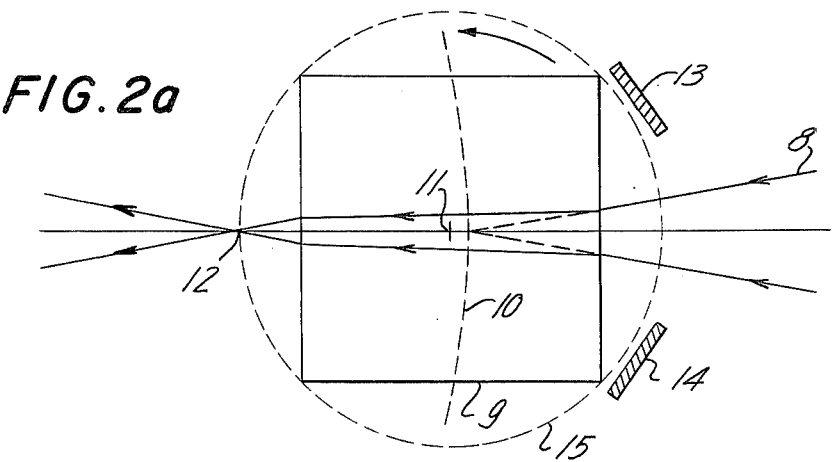
FIGS. 2a-e show the system in different ray paths.
Figure 2B:
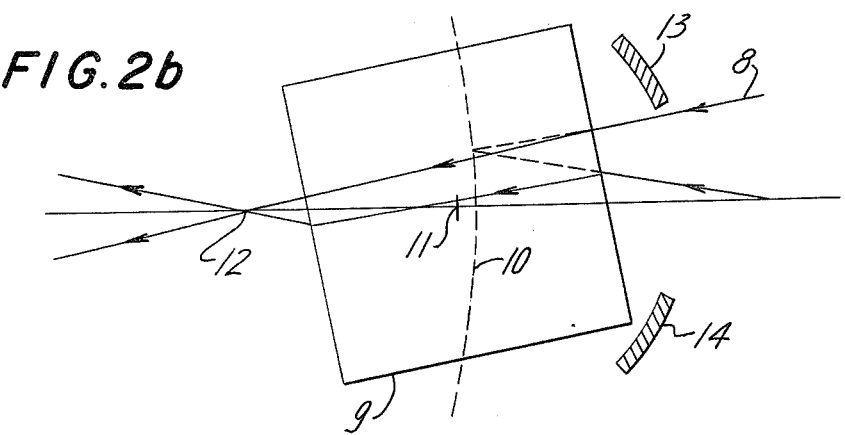
Figure 2C:
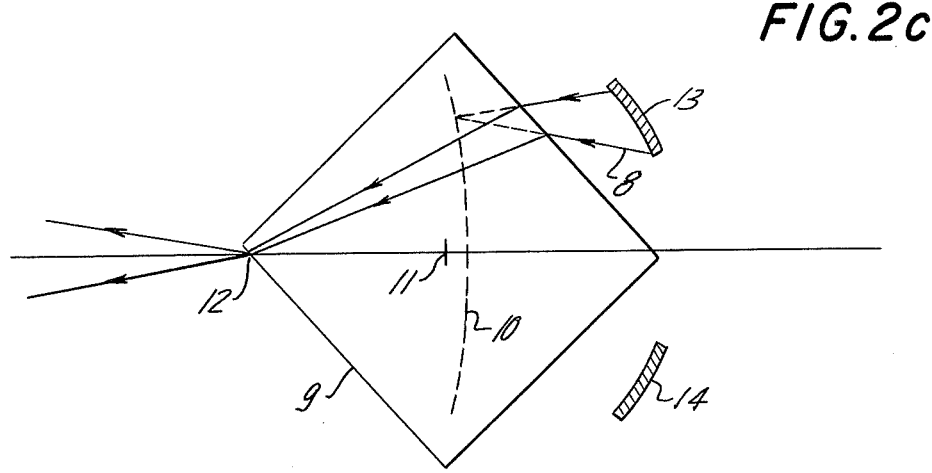
Figure 2D:
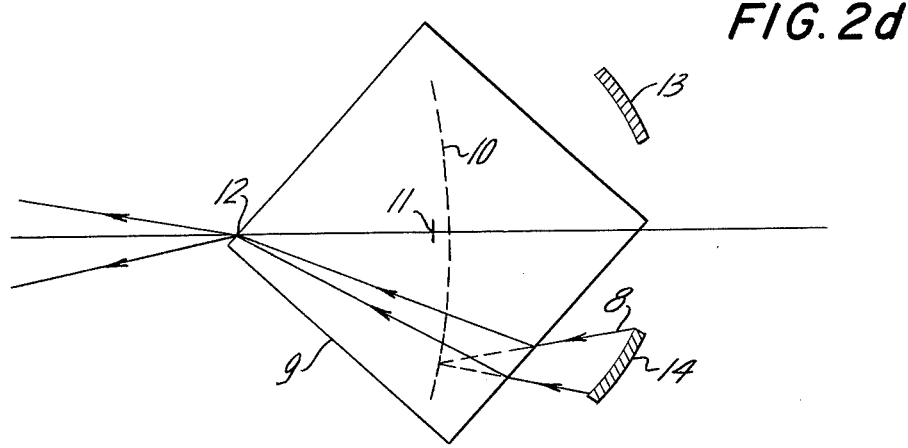
Figure 2E:
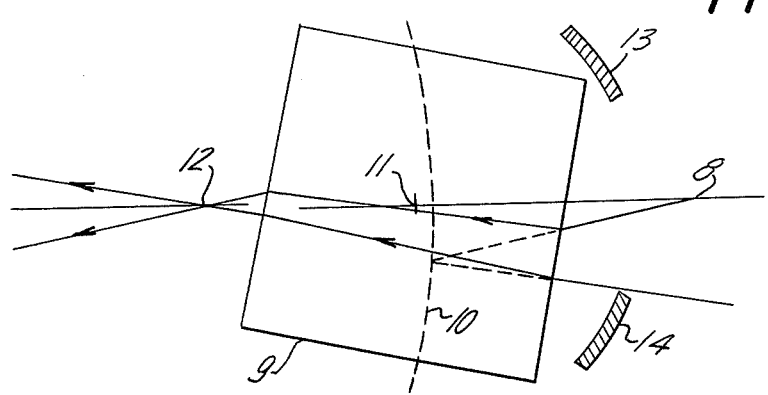

In FIG. 2e a further rotation of the prism has caused the ray bundle to move to let the lower part of the image be viewed by the detector so that it will be scanned from below and upwards, switching over to the radiation source 13 and then suddenly to radiation source 14, and so on.

The reference radiation sources are intended to give off thermal radiation of a constant temperature. During the time when the detector views the reference radiation sources the video signal obtained from the detector may be used as an absolute temperature reference or solely to stabilize the D.C. level of the video signal. The reference radiation sources 13 and 14 are here supposed to have the same temperature, but in another embodiment the temperatures may be different. In the one position, FIG. 2c, the detector views the source 13, while in the other position, FIG. 2d, it views the source 14. The video signal from the detector will thereby have two reference levels. One of said levels is used to control the absolute level of the voltage, whereas the difference in the two reference levels is used to control the amplification of the video signal (see FIG. 6).

The design of a reference radiation source has not been shown in more detail here, since this is assumed to be generally known.

FIG. 3 shows a device similar to the one of FIG. 2 but have an octogonal prism 16. In this embodiment, there is not shown the remaining optics which may include an additional prism designed so that the detector image (point 12) located within the prism 16 can be sensed by the detectors. The plane 17 is scanned by the prism, which prism rotates in a counterclockwise direction about an axis 11.

Figure 3A:
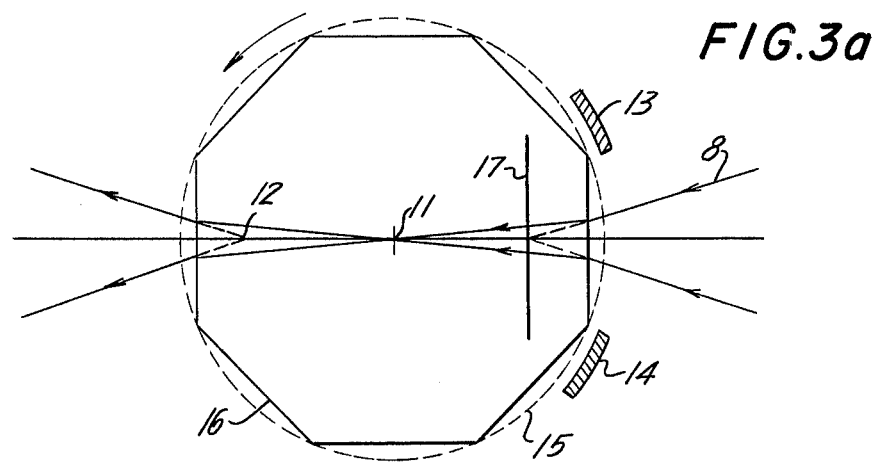
FIGS. 3a-f show different ray paths.
Figure 3B:
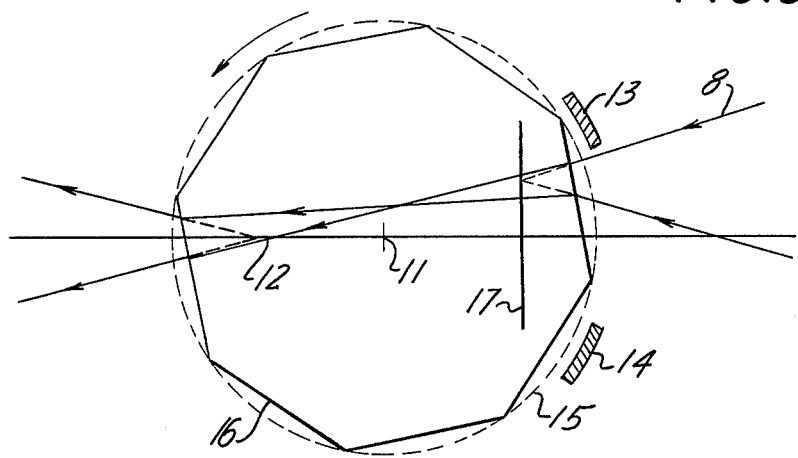
Figure 3C:
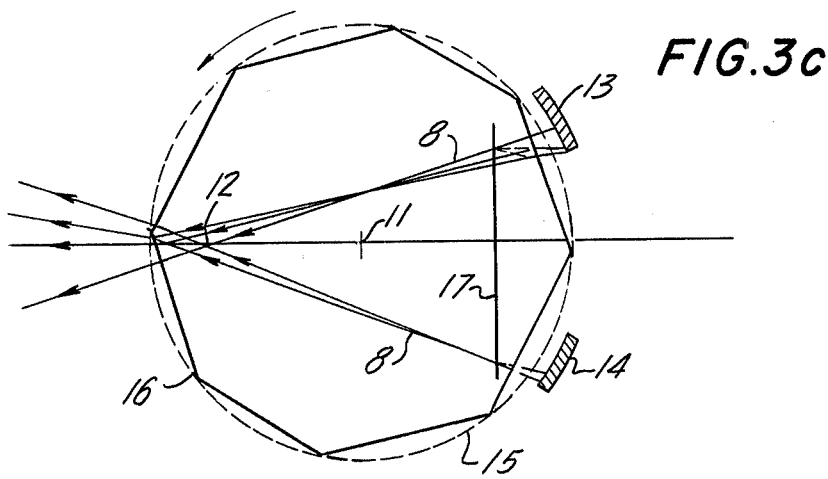

In FIGS. 3a and b the detector views the central part and the upper part of the object image, respectively. In FIG. 3c both reference radiation sources 13 and 14 are viewed simultaneously but to a different extent. The detector will thereby view the upper reference radiation source 13 to a greater extent than the lower one.

Figure 3D:
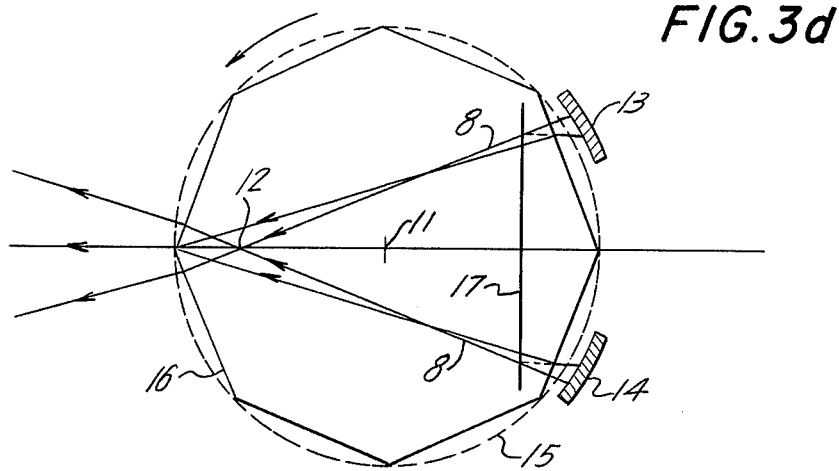
Figure 3E:
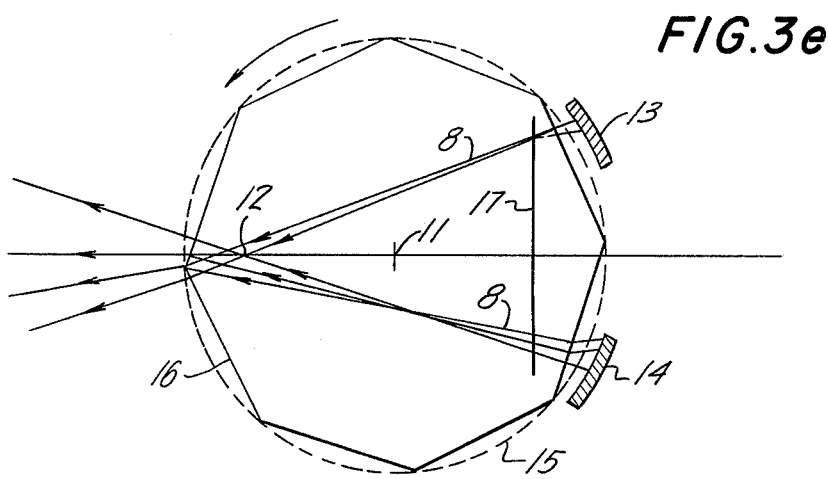
Figure 3F:
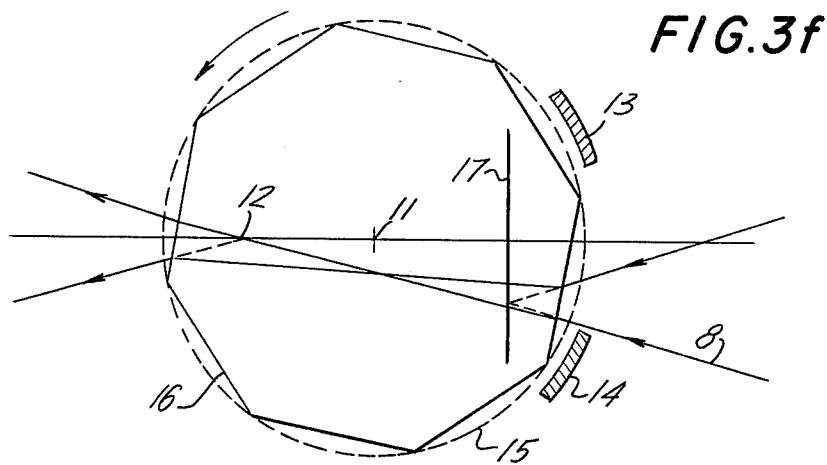

In FIG. 3d the detector views the reference radiation sources to the same extent but in FIG. 3e the lower reference radiation source is viewed to a greater extent than the upper one. In FIG. 3f the detector views the object image and so on.

In the embodiment of FIG. 3 both reference radiation sources are viewed by the detector simultaneously. If said sources have the same temperature, the optical characteristics of the prism are used to give the reference radiation the maximum efficiency.

If, on the other hand, these sources have different temperatures, this may be utilized in the following way. When the prism rotates from the position in FIG. 3d to the one in FIG. 3e, the detector views more and more of reference source 14 and less and less of reference source 13. Now, if the source 14 has a higher temperature, the video signal of the detector will increase or decrease, depending on the detector polarity when scanning takes place from FIG. 3c to FIG. 3e. Analogous to the embodiment of FIG. 2, described above, this varying video signal may be used to control the absolute level as well as the amplification.

In the simplest embodiment two positions of the prism are chosen in which a signal treatment is performed similar to that of FIG. 2. Alternatively, the greater part of the position of FIGS. 3c-e may be used. FIGS. 3c-e may, for instance, be divided into two parts, one of which to control the absolute level and the other to control the amplification level.

The invention is, of course, not limited to prisms having four or eight facets.

The reason why the detector in the FIG. 2 embodiment only views one reference radiation source at a time is that the image of the detector lies on the circumscribed circle of the prism. In the FIG. 3 embodiment, where the image of the detector lies in the prism, both reference radiation sources may be viewed simultaneously by the detector on certain occasions.

Figure 4:
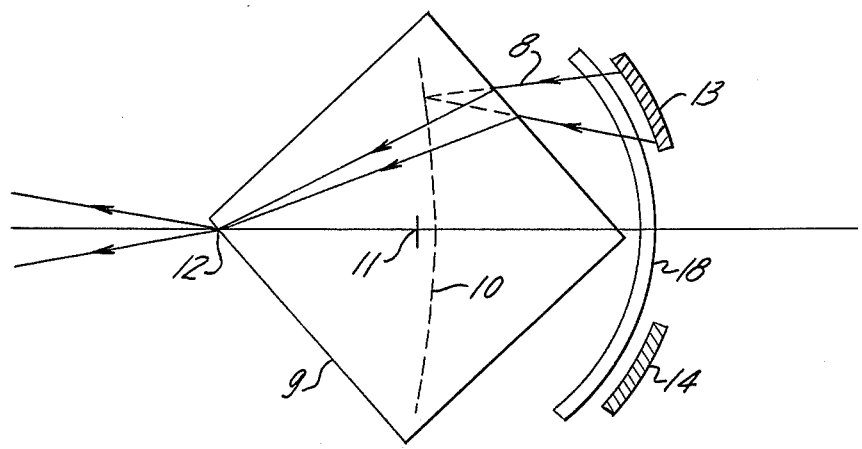
FIGS. 4 and 5 show further embodiments of the present invention.

When the prism rotate very rapidly air currents are created having a harmful effect on the constant temperature of the reference radiation sources. In the FIG. 4 embodiment the device according to FIG. 2 is provided with a screen, positioned between prism 9 and the reference radiation sources 13 and 14. Said screen 18 is made of a material transparent to the present radiation. Screen 18 is placed so as to divide the space in which the prism rotates from the space in which the reference radiation sources are positioned. If the screen is made so that the radiation properties coincide or are similar to the entire optics or parts thereof in front of the prism, i.e., between the prism and the object, the influence of the radiation emitted or reflected from said optics is eliminated or reduced in the video signal.

Figure 5:
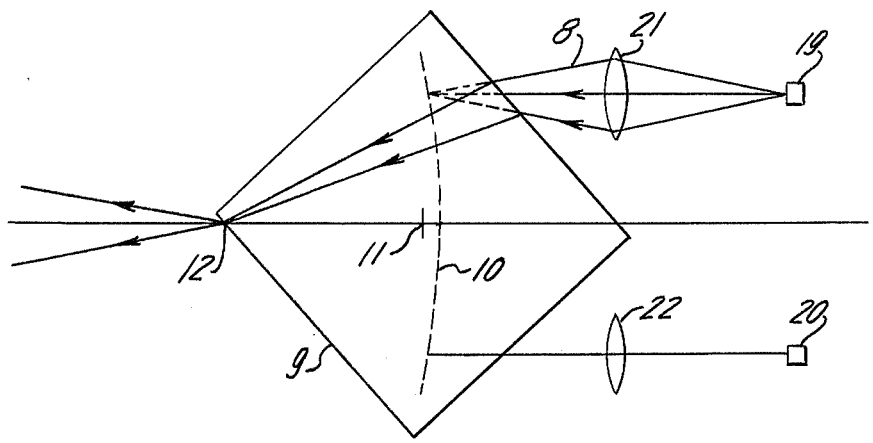

The reference radiation sources must have a certain area size to make the reference radiation effective. However, they may have very small dimensions if they are provided with positive lenses in front. FIG. 5 shows an embodiment in which lenses 21 and 22 are placed in front of the reference radiation sources 19 and 20 in a system according to FIG. 2. The screen of FIG. 4 and the lenses of FIG. 5 may, of course, be combined to let the lenses form part of the screen.

In a device comprising two rotating prisms the reference radiation sources may be placed in connection with one prism or the other. Depending on whether an often repeated scanning of the reference radiation sources is sought or not, said sources are placed at the prism with the fastest rotation or at the prism with the slowest rotation, respectively.

It has been mentioned above that the radiation from the reference radiation sources may be used as an absolute temperature reference or to stabilize the D.C. level of the video signal.

Figure 6:
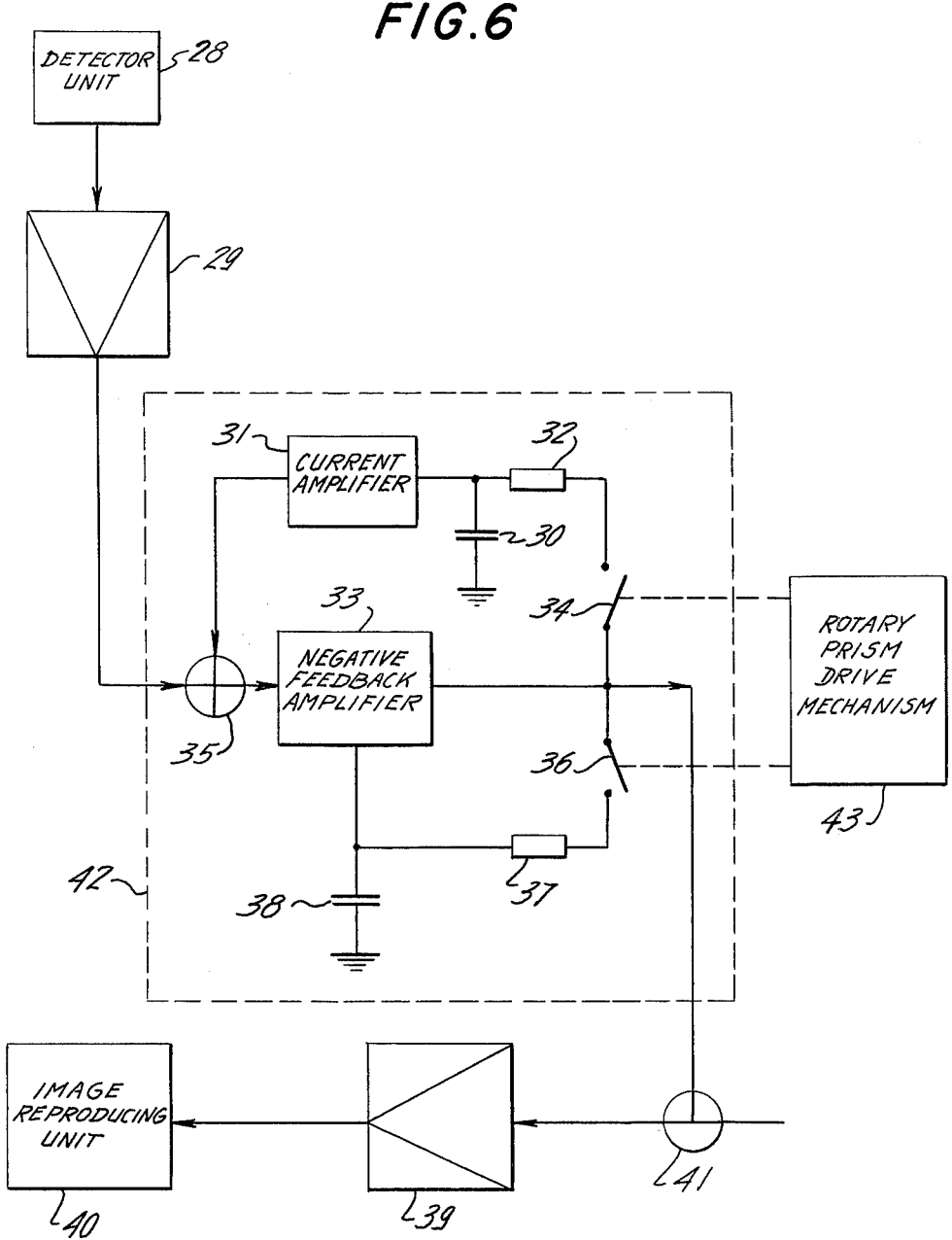
FIG. 6 shows a schematic circuit built in accordance with the teachings of the present invention.

FIG. 6 shows an embodiment of a block diagram intended for utilizing a device according to the invention in the video signal path having two reference radiation sources of different temperature. This embodiment relates to the FIG. 2 device in which the detector first views radiation from one reference radiation source and then from the second source, i.e., radiation from both reference radiation sources will not hit the detector simultaneously.

Source 13 of FIG. 2 is used to control the absolute voltage level of the video signal, whereas the difference between the reference levels is used to control the amplification of the video signal from detector unit 28.

FIG. 6 shows the main principle of a presentation device for infrared radiation. Blocks 28, 29, 39 and 40 represent circuits which may vary within wide limits. Means 30 – 38 shown within outline block 42 utilizes the reference radiation sources to control certain properties of the system. The infrared scanning system is divided into a number of blocks in which, according to the FIG. 6 embodiment, block 28 comprises a detector unit, block 29 comprises amplification devices, and block 42 devices are intended to utilize the radiation from the reference radiation sources while block 40 comprises an image reproducing unit. When the system comprises a detector unit of the multi-element type, blocks 29 and 42 must lie in the signal path from every detector element. These signal paths thus meet at a point in front of the amplification unit 39, said point being designated as 41 in the figure. Blocks 28, 29, 39 and 40 are of known design and shall not be explained in more detail here. It should be pointed out that block 42 may be situated in block 29 or between blocks 28 and 29.

For the control of the absolute voltage level of the video signal a capacitor 30 is being charged during the time when the reference radiation source 13 of FIG. 2c is viewed. Capacitor 30 is arranged in a negative feedback circuit of an amplifier 33. Said amplifier 33 is a voltage responsive gain controlled negative feedback video amplifier such as one having a field effect transistor in its gain control path. Said feedback circuit also comprises a current amplifier 31 and a resistance 32.

Capacitor 30 is charged to a voltage level so that the output from video amplifier 33 is set to a predetermined value, preferably 0 V.

The capacitor 30 is not influenced during the time when the object is scanned, since the circuit is then opened by switch 34, arranged between the output terminal of the video amplifier 33 and said capacitor 30. The voltage is, however, still maintained on the capacitor so that this correction voltage is added to the video signal in a summation point 35.

In the position shown in FIG. 2d the output voltage from video amplifier 33 may control its own amplification by means of a further feedback circuit, comprising a switch 36, a resistance 37 and a capacitor 38. The output voltage from amplifier 33 is now adjusted to a present value, which differs from the above-mentioned value. During the scanning of the object, the video amplifier maintains the amplification obtained in the position of FIG. 2d by some kind of store function, said function in the FIG. 6 embodiment consisting of the charged capacitor 38, the voltage of which controls the amplification of video amplifier 33.

Switches 34 and 36 are preferably controlled by the rotary prism drive mechanism shown schematically at 43.

Figure 7:
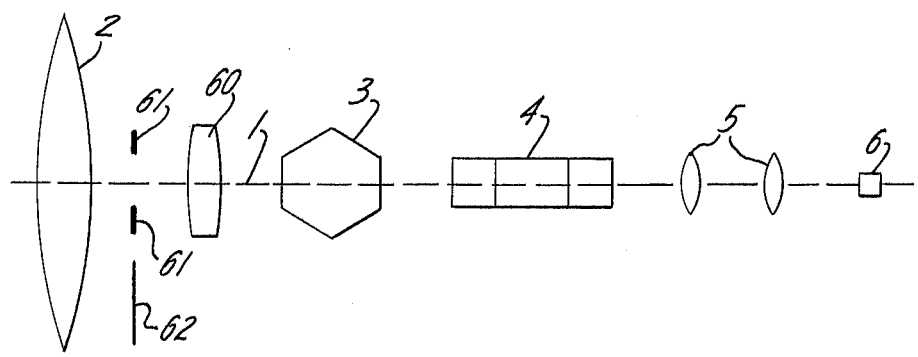
FIG. 7 shows schematically an infrared system having a reference radiation source in a focal plane.

In some cases it may be preferable to place the reference radiation source in a focal plane in the system, of which FIG. 7 shows an embodiment. The parts designated 1 – 6 correspond to those of FIG. 1.

In the system of FIG. 7 there is provided a lens 60, two reference radiation sources 61 and a focal plane designated as 62.

FIG. 7 is very schematic and the reference sources 61 have been listed as two sources placed on either side of the optical axis. However, it is obvious that if the reference sources are to be scanned once for each horizontal scanning, the sources 61 must be placed at 90° to their position in FIG. 7 in a plane transverse to focal plane 62. If the sources 61 are to be scanned once for each vertical scanning they are placed as shown in FIG. 7. Since the prism 3 is mounted for vertical scanning, it is normally placed closer to the focal plane 62 than the prism 4 for horizontal scanning.

By placing a so-called intermediate optics between the prisms 3 and 4 comprising one or more lenses and removing lens 60, a focal plane containing the reference radiation sources can be obtained between the intermediate optics and prism 3. This is not shown in the FIG. 7 embodiment. Said intermediate optics also enables dimensioning so that the focal plane comes between prism 3 and lens 2 of FIG. 7.

Figure 8A:
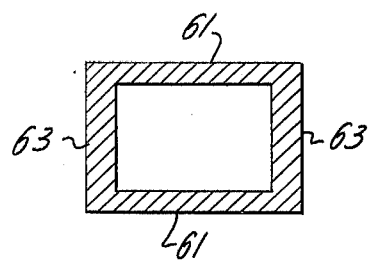
FIG. 8a shows region 61 in which the radiation references are situate.

FIG. 8a shows the focal plane in which the reference sources 61 of FIG. 7 are situated. If the region shown in FIG. 8a is to be scanned vertically, then the sources 61 are situated at the upper and lower part of the region. If alternately the region is to be scanned horizontally, sources 63 are situated on either side of the region.

Figure 8B:
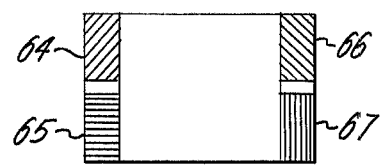
FIG. 8b shows an alternate design of a group of temperature references which could be utilized in the schematic system of FIG. 7.

FIG. 8b shows an embodiment of how reference sources actually could be situated in the region shown in FIG. 8a. In FIG. 8b there are shown four different radiation sources 64, 65, 66 and 67, each having different temperatures. In this embodiment all of the reference sources are placed at the side of the region and thus horizontal scanning gives four temperature references during each horizontal scanning to be compared with the signal from the actual image at combinations by means of appropriate electronic design. With this arrangement there is also an opportunity to get different references for the upper and the lower part of the vertical scanning as well as for the two sides of the horizontal scanning.

Although this invention has been described with respect to its preferred embodiments, it should be understood that many variations and modifications will now be obvious to those skilled in the art, and it is preferred, therefore, that the scope of the invention be limited, not by the specific disclosure herein but only by the appended claims.

What is claimed:

1. A device for measuring the radiation from an object by means of an optical system comprising detecting means for providing an output signal in response to radiation impinging thereon, scanning means for scanning a ray bundle in an image space, said scanning means including at least one refracting rotating prism, the center of rotation of said prism and said detecting means defining an optical axis, at least two reference radiation sources spaced from one another and positioned in the optical system in order that said radiation sources are scanned by the prism and thence by said detecting means at predetermined intervals when a corner of said rotating prism passes through said optical axis, means utilizing said detecting means output signal, and control means for controlling said utilizing means in a manner whereby an object image signal is utilized by said utilizing means at intervals not coincident with scanning of either of said radiation sources, said ray bundle converging toward said prism and said radiation sources each being of a size so as to fill said ray bundle.

2. A device in accordance with claim 1, wherein both reference radiation sources are at least partly scanned simultaneously.

3. A device for measuring the radiation from an object by means of an optical system comprising detecting means for providing an output signal in response to radiation impinging thereon, scanning means for scanning in an image space, said scanning means including at least one refracting rotating prism, at least two reference radiation sources which emit different intensities of radiation arranged in the optical system in order that said radiation sources are scanned by the prism and thence by said detecting means at predetermined intervals, means utilizing said detecting means output signal, and control means for controlling said utilizing means in a manner whereby an object image signal is utilized by said utilizing means at intervals not coincident with scanning of either of said radiation sources.

4. A device for measuring the radiation from an object by means of an optical system comprising detecting means for providing an output signal in response to radiation impinging thereon, scanning means for scanning in an image space, said scanning means including at least one refracting rotating prism, a reference radiation source arranged in the optical system in order that said radiation source is scanned by the prism and thence by said detecting means at predetermined intervals, means utilizing and detecting means output signal, control means for controlling said utilizing means in a manner whereby an object image signal is utilized by said utilizing means at intervals not coincident with the interval when said radiation source is scanned, and shield means located between said reference radiation source and said rotating prism to physically shield said reference radiation source from said rotating prism.

5. A device for measuring the radiation from an object by means of an optical system comprising detecting means which produces a video signal in response to radiation impinging thereon, scanning means for scanning in an image space, said scanning means including at least one refracting rotating prism, at least two reference radiation sources arranged in the optical system in order that said radiation sources are scanned by the prism and thence by said detecting means at predetermined intervals, said first reference radiation source being operative to provide an absolute voltage level for said video signal, said second reference radiation source being operative to control the amplification of the video signal, and control means for controlling said detecting means in a manner whereby an object image video signal is produced by said detecting means at intervals not coincident with scanning of either of said radiation sources.

6. A device for measuring the radiation from an object by means of an optical system comprising detecting means for providing an output signal in response to radiation impinging thereon, scanning means for scanning in an image space, said scanning means including at least one refracting rotating prism, the center of rotation of said prism and said detecting means defining an optical axis, a reference radiation source disposed in a focal plane between said object and said detecting means and arranged in the optical system in order that said radiation source is scanned by the prism and thence by said detecting means at predetermined intervals when a corner of said rotating prism passes through said optical axis, means utilizing said detecting means output signal, and control means for controlling said utilizing means in a manner whereby an object image signal is utilized by said utilizing means at intervals not coincident with the interval when said radiation source is scanned.

* * * * *